(12) United States Patent
Morton

(10) Patent No.: US 10,309,295 B2
(45) Date of Patent: Jun. 4, 2019

(54) UNIFLOW ENGINE WITH FLUID FLOW ARRANGEMENT

(71) Applicant: VOLVO TRUCK CORPORATION, Göteborg (SE)

(72) Inventor: Richard Kellogg Morton, Hagerstown, MD (US)

(73) Assignee: Volvo Truck Corporation, Göteborg (SE)

(*) Notice: Subject to any disclaimer, the term of this patent is extended or adjusted under 35 U.S.C. 154(b) by 0 days.

(21) Appl. No.: 15/512,558

(22) PCT Filed: Sep. 29, 2014

(86) PCT No.: PCT/US2014/058103
§ 371 (c)(1),
(2) Date: Mar. 19, 2017

(87) PCT Pub. No.: WO2016/053253
PCT Pub. Date: Apr. 7, 2016

(65) Prior Publication Data
US 2017/0335752 A1    Nov. 23, 2017

(51) Int. Cl.
*F02B 25/08*    (2006.01)
*F02B 23/10*    (2006.01)
(Continued)

(52) U.S. Cl.
CPC ............ *F02B 25/08* (2013.01); *F02B 23/104* (2013.01); *F02B 25/04* (2013.01); *F02B 75/28* (2013.01); *F02B 2720/236* (2013.01); *F02F 1/22* (2013.01)

(58) Field of Classification Search
CPC ........ F02B 23/104; F02B 25/02; F02B 25/08; F02B 75/28; F02B 75/282; F02B 75/285;
(Continued)

(56) References Cited

U.S. PATENT DOCUMENTS

| 1,623,704 A | * | 4/1927 | Scott | ................... F02B 75/28 123/51 B |
| 2,204,296 A | * | 6/1940 | Brooks | .............. F02B 25/00 123/65 R |

(Continued)

FOREIGN PATENT DOCUMENTS

| CN | 202970888 U | 6/2013 |
| GB | 589988 | 7/1947 |

(Continued)

OTHER PUBLICATIONS

International Search Report (dated Jan. 7, 2015) for corresponding International App. PCT/US2015/058103.
(Continued)

*Primary Examiner* — Hung Q Nguyen
*Assistant Examiner* — Mark L. Greene
(74) *Attorney, Agent, or Firm* — WRB-IP LLP

(57) ABSTRACT

A uniflow engine includes a cylinder having a cylinder wall, an inlet channel, an extension of a central axis of the inlet channel first intersecting the cylinder wall in a first portion of the cylinder and next intersecting the cylinder wall in a second portion of the cylinder opposite the first portion of the cylinder, an intake air gallery, the intake air gallery having a gallery wall and being in flow communication with the inlet channel, and a plurality of intake ports extending between the cylinder wall and the gallery wall, at least some of the intake ports having different areas at the cylinder wall measured perpendicular to longitudinal axes of the intake ports, and wherein an area of at least one in take port in the first portion of the cylinder is larger than an area of at least one intake port in the second portion of the cylinder.

24 Claims, 4 Drawing Sheets

(51) Int. Cl.
  *F02B 25/04* (2006.01)
  *F02B 75/28* (2006.01)
  *F02F 1/22* (2006.01)

(58) Field of Classification Search
  CPC .......... F02B 2710/036; F02B 2720/136; F02B 2720/236; F02B 25/04
  See application file for complete search history.

(56) References Cited

U.S. PATENT DOCUMENTS

| | | | |
|---|---|---|---|
| 2,646,779 | A | 7/1953 | Fiser |
| 2,744,506 | A | 5/1956 | Reynolds |
| 2,853,983 | A * | 9/1958 | Sawle, Jr. ................ F01B 7/14 123/41.16 |
| 3,059,626 | A | 10/1962 | Froehlich et al. |
| 3,425,399 | A | 2/1969 | Ward et al. |
| 3,492,979 | A | 2/1970 | Osojnak |
| 3,799,130 | A | 3/1974 | Dahlstrom |
| 4,254,745 | A * | 3/1981 | Noguchi ................ F02B 25/08 123/319 |
| 6,382,176 | B1 | 5/2002 | Cobb, Jr. |
| 8,051,830 | B2 | 11/2011 | Taylor |
| 2013/0025556 | A1 * | 1/2013 | Hofbauer ................ F01B 7/08 123/18 R |

FOREIGN PATENT DOCUMENTS

| | | |
|---|---|---|
| GB | 885281 | 12/1961 |
| JP | 201498346 A | 5/2014 |

OTHER PUBLICATIONS

International Preliminary Report on Patentability (dated Mar. 13, 2017) for corresponding International App. PCT/US2015/058103.
Chinese Official Action (dated Dec. 20, 2018) for corresponding Chinese App. 201480082316.8.

* cited by examiner

UNIFLOW ENGINE WITH FLUID FLOW ARRANGEMENT

BACKGROUND AND SUMMARY

The present invention relates generally to uniflow engines and, more particularly, to arrangements for scavenging of such engines.

Most ported engines, which typically operate on the 2-stroke cycle, induce a high degree of swirl to the incoming air charge in order to maximize the available surface area of the intake port band for intake charge flow, and therefore reduced pumping work, as well as to assure high turbulence for good combustion. However, imparting swirl to the incoming charge requires a certain amount of energy, increasing pumping work, results in high heat transfer to the cylinder walls, causes mixing of the fresh charge with the exhaust gases remaining in the cylinder, and may entrain lubricating oil from the walls, adversely affecting emissions. In addition, filling of a 2-stroke cylinder depends on the pressure difference between intake and exhaust ports (valves), not the absolute flow restriction of the intake system, and intake port areas are often restricted to achieve a more favorable pressure differential across the cylinder.

Regardless of whether the engine is an opposed piston engine or a single piston engine, when the intake is at one end of the cylinder and the exhaust is at the other end, the cylinder and the engine are referred to as having a "uniflow" design or "uniflow scavenged" design, scavenging being the description of the process whereby intake gas displaces the exhaust gas from the cylinder under pressure supplied by external means. The typical structure and operation of opposed piston engines is shown in, for example, U.S. Patent App. Pub. US2013/0036999 which is incorporated by reference.

The gas exchange process in a 2-stroke engine/machine occurs when the cylinder is near its maximum volume, i.e. bottom dead center in a conventional single piston engine, and is driven by some external means of creating a pressure difference between the intake and exhaust passages. A process where the incoming charge air enters the cylinder at one end of the cylinder, and pushes the combusted gases through exhaust passages in the other end of the cylinder can be realized by intake ports in a cylinder or cylinder liner that are uncovered by the piston, and poppet or other exhaust valves in the cylinder head in the case of a conventional single piston engine design, or by intake ports uncovered by one piston and exhaust ports uncovered by a second piston in the case of an opposed piston engine. In most ported 2-stroke engines, the intake port can be in the form of a series of slots or holes more or less equally distributed around part of the circumference of the cylinder bore, generally patterned or shaped so as to cause the intake air to swirl about the axis of the cylinder.

It is desirable to minimize the turbulence of the intake air entering a ported cylinder in order to minimize heat transfer, minimize work needed to induce charge motion, and minimize mixing of fresh and burned gases in order to more closely achieve "perfect displacement" scavenging.

In accordance with an aspect of the invention, a uniflow engine comprises a cylinder having a cylinder wall, an inlet channel, an extension of a central axis of the inlet channel first intersecting the cylinder wall in a first portion of the cylinder and next intersecting the cylinder wall in a second portion of the cylinder opposite the first portion of the cylinder, an intake air gallery, the intake air gallery having a gallery wall and being in flow communication with the inlet channel, and a plurality of intake ports extending between the cylinder wall and the gallery wall, at least some of the intake ports having different areas at the cylinder wall measured perpendicular to longitudinal axes of the intake ports, and wherein an area of at least one intake port in the first portion of the cylinder is larger than an area of at least one intake port in the second portion of the cylinder.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
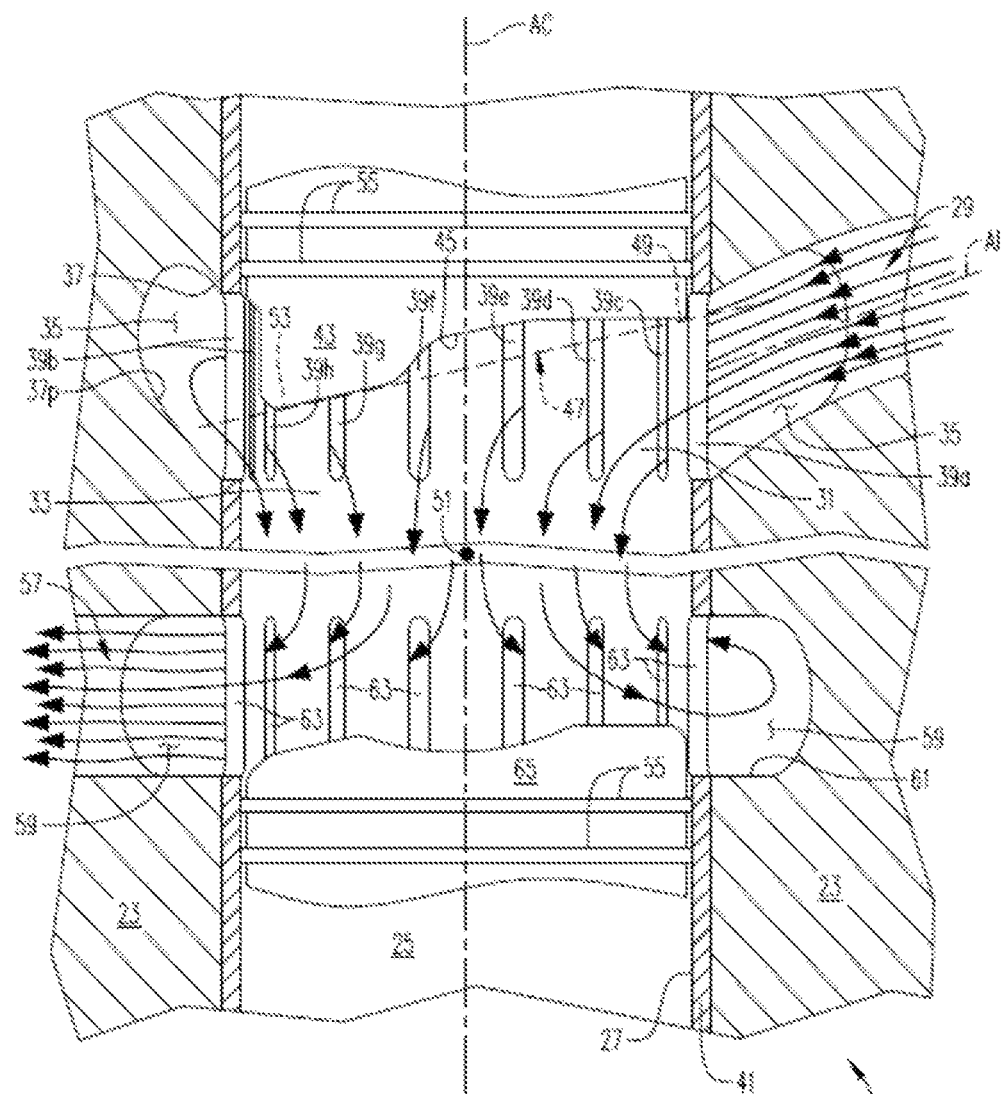
FIG. 1 is a partially cross-sectional view of a portion of an opposed piston uniflow engine according to an aspect of the present invention taken at section 1-1 of FIG. 2.
Figure 2:
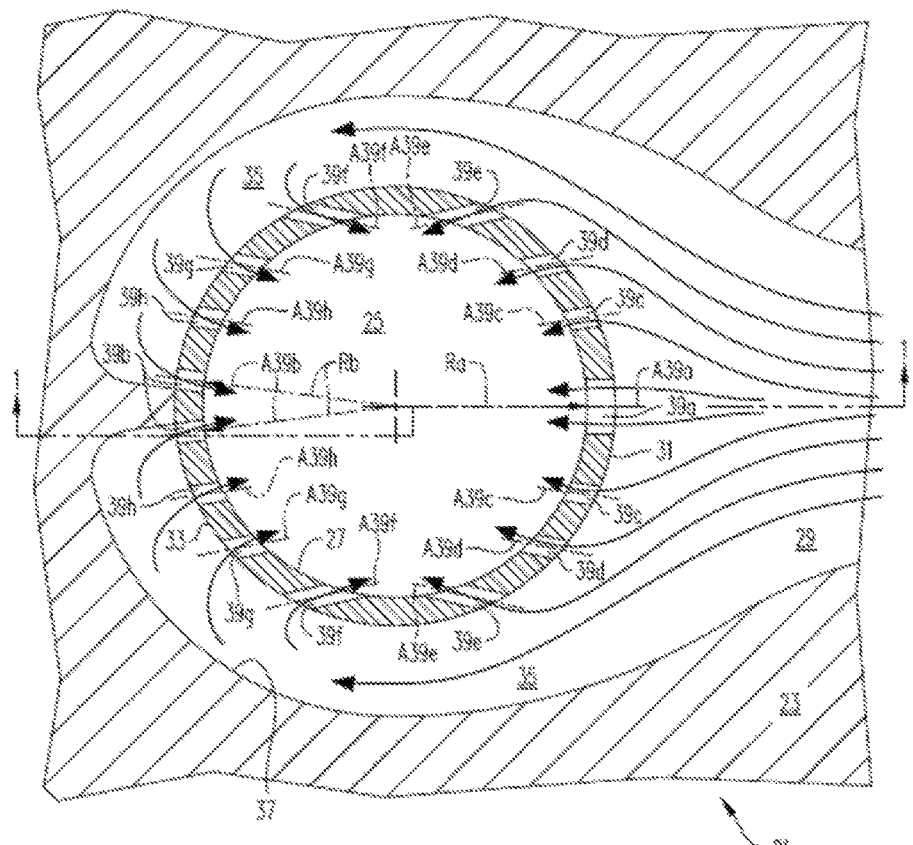
FIG. 2 is a partially cross-sectional view of a portion of a uniflow engine as shown in FIG. 1.
Figure 3:
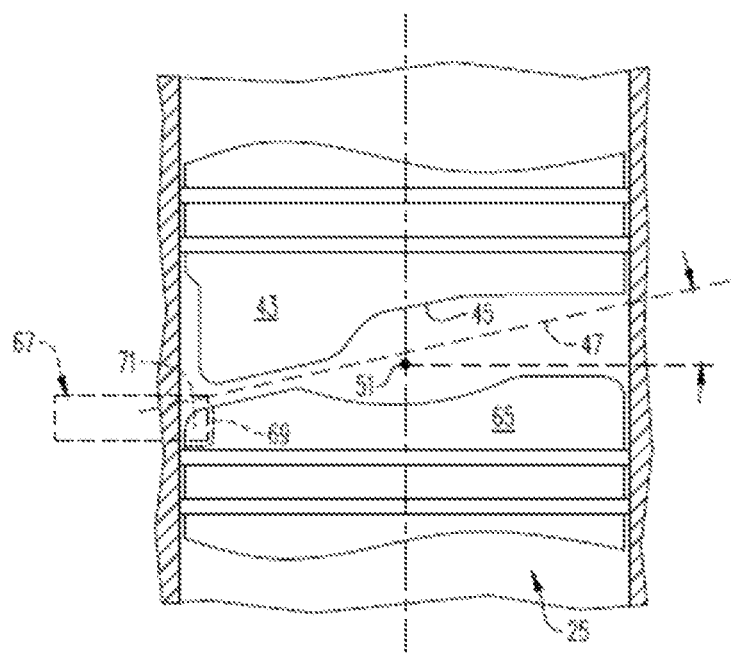
FIG. 3 is a partially cross-sectional view of a portion of a uniflow engine according to an aspect of the present invention wherein opposed pistons are at a point of minimum volume in the cylinder.
Figure 4:
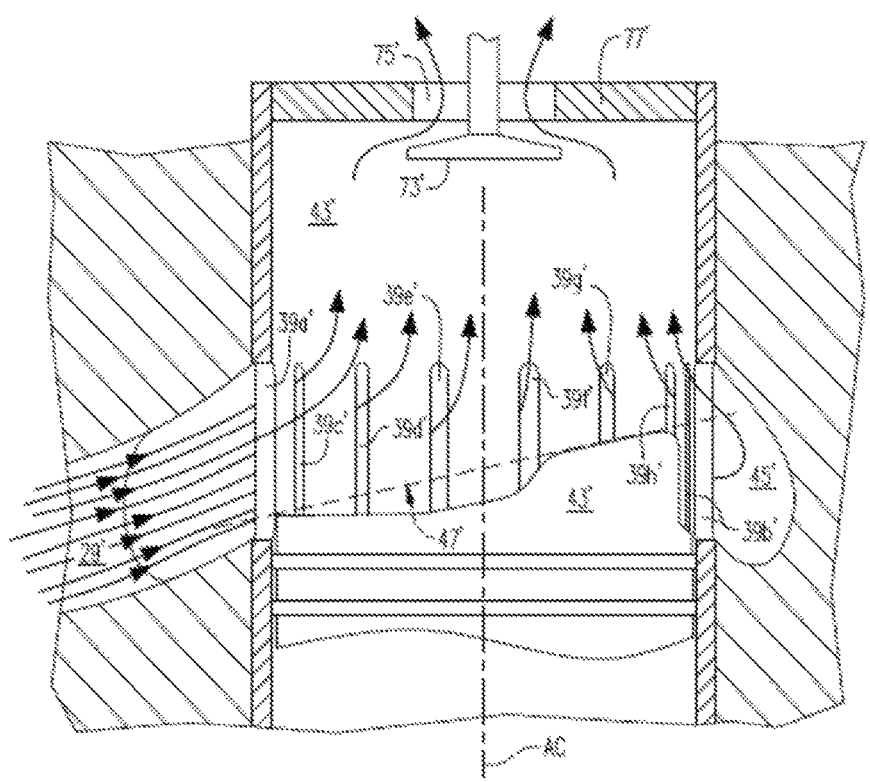
FIG. 4 is a partially cross-sectional view of a portion of a single piston uniflow engine according to another aspect of the present invention.

FIGS. 1-3 shows a portion of a ported uniflow engine 21 with a fluid flow arrangement according to an aspect of the present invention. The uniflow engine 21 can comprise an engine block 23 or other structure in which a cylinder 25 (i.e., at least one) having a cylinder wall 27 is provided. The cylinder 25 is ordinarily circularly cylindrical, but may have other shapes. FIGS. 1-3 show an opposed piston engine 21, however, it will be appreciated that the invention is applicable to a single piston engine 21' as seen in FIG. 4. The opposed piston engine 21 is shown with the cylinder oriented such that the intake is at the top and the exhaust is at the bottom, while the single piston engine 21' is shown with cylinder oriented such that the intake is at the bottom and the exhaust is at the top, however, in either case, the orientation of the intake and exhaust at the top or the bottom may be reversed. For purposes of discussion, structures of the opposed piston engine 21 will be described, however, it will be appreciated that such structures are also applicable to the single piston engine 21', except where otherwise indicated.

An inlet channel 29 is provided, usually formed in the engine block, into which intake air (or air and fuel, or other gas—hereinafter generically referred to as "air") is drawn and directed toward the cylinder 25. The inlet channel 29 may comprise plural channels. An extension of a central axis AI of the inlet channel 29 first (in a direction of air flow) intersects the cylinder wall 27 in a first portion 31 (FIGS. 1-2) of the cylinder 25 and next in a second portion 33 of the cylinder opposite the first portion of the cylinder. The first and second portions 31 and 33 may be but are not necessarily first and second halves of the cylinder 25. The central axis AI of the inlet channel 29 can define an acute angle greater than 0° with a longitudinal axis AC of the cylinder 25 to facilitate providing an axial component to the motion of the air entering the cylinder.

An intake air gallery 35 ordinarily extends around at least a majority of a circumference of the cylinder 25, however, the intake air gallery may comprise two or more galleries that may (or may not be) be separated by a wall. The intake air gallery 35 has a gallery wall 37 and is in flow communication with the inlet channel 29. If plural channels 29 are provided, they may be arranged to be in flow communication with respective galleries 35 or portions of a single gallery at different portions around the circumference of the cylinder.

A plurality of intake ports 39a ... 39h extend between the cylinder wall 27 and the gallery wall 37. The intake ports 39a ... 39h can be formed in a cylinder liner 41, an interior of which forms the cylinder 25. While FIG. 2 shows fifteen intake ports, it will be appreciated that any number of intake ports can be provided. At least some of the intake ports 39a and 39b have different areas at the cylinder wall 27 measured perpendicular to longitudinal axes A39a and A39b of the intake ports. An area of at least one intake port 39a in the first portion 31 of the cylinder 25 is larger than an area of at least one intake port 39b in the second portion 33 of the cylinder. For example, the area of at least one intake port 39a disposed in the first portion 31 of the cylinder 25 can be larger than the area of another intake port 39b located substantially diametrically opposite the intake port 39a.

The location and dimensions of the intake ports 39a ... 39h is ordinarily designed to facilitate directing an intake air charge so that it enters the cylinder 25 in a way that achieves minimum turbulence (and, thus, causing less heat transfer to the walls of the cylinder, requiring less work to induce charge motion, and resulting in less mixing of fresh and burned gases) while evenly filling the cylinder across its diameter, and thus facilitating the creation of (as close as possible to) a generally cylindrical volume that expands along the axis AC of the cylinder 25 to push out the spent gases with a minimum of mixing or energy exchange. Ports on the back side of the cylinder 25, e.g., port 39b, relative to the central axis AI of the inlet channel 29, i.e., the second portion 33 of the cylinder, are ordinarily smaller than ports on the front side of the cylinder, e.g., port 39a, relative to the central axis of the inlet channel, i.e., the first portion 31 of the cylinder, and are ordinarily fed from a portion of the intake air gallery 35 that has a reduced cross-section relative to portions of the intake air gallery closer to the ports on the front side of the cylinder. The ports on the back side or second portion 33 of the cylinder 25 are ordinarily primarily intended to cool the back side of a piston 43 in the cylinder and to create a small air curtain near the cylinder wall to facilitate completely filling the cylinder.

The piston 43 can also be shaped to facilitate creation of the generally cylindrical volume by sloping a face 45 of the piston so that a mean face 47 of the piston defines a non-zero angle with a plane perpendicular to a longitudinal axis AC of the cylinder 25. The lowest part 49 of the mean face 47 of the piston 43, i.e., the part furthest from what shall be referred to as a position of minimum volume in the cylinder 51 (i.e., the part that extends the least into the cylinder), is adjacent the first portion 31 of the cylinder. The position of minimum volume in the cylinder 51 is defined as the point in the cylinder 25, in a single piston arrangement (FIG. 4), at which the piston is at top dead center or, in an opposed piston arrangement (FIG. 3), at which the two pistons are closest together. A highest part 53 of the mean face 47 of the piston 43 closest to the position of minimum volume in the cylinder 51 (i.e., that protrudes the farthest into the cylinder) is adjacent the second portion 33 of the cylinder 25.

Ordinarily, the total area of the intake ports 39a ... 39h is chosen to achieve the desired flow rate at a desired pressure change across the uniflow engine. The size of the walls (i.e., thickness between the cylinder wall 27 and the intake air gallery wall 37 and circumferential length of walls) separating the intake ports 39a ... 39h is sufficient to provide an acceptable level of mechanical strength for the intended operating conditions in the cylinder. The spacing of the intake ports 39a ... 39h and, thus, the width of the intake ports, is ordinarily chosen so that piston rings 55 (FIG. 1) on the piston 43 in the cylinder 25 do not expand into the ports or catch on the end walls (top and bottom portions) of the ports when the piston passes back and forth across the intake ports. The length and position of the intake ports along the cylinder axis AC are selected to function together with the piston, which acts as a valve, to achieve a desired opening and closing profile, and to obtain a desired effective compression ratio of the cylinder.

It will be observed that, in FIG. 2, the intake ports 39a and 39b are not exactly diametrically opposed from each other, however, the port 39b is disposed at about 170°-190° on the opposite side of the diameter of the cylinder 25 to the port 39a. In the embodiment illustrated in FIGS. 1-2, the intake air gallery 37 does not extend completely around the circumference of the cylinder 25 but, rather, only around a majority of the circumference, with two ports 39b defining ends of the gallery. If the intake air gallery were formed so that it extended around an entire circumference of the cylinder, the port of minimum area could be disposed diametrically opposite the port of greatest area.

Areas of intake ports decrease in area from a maximum area of at least one intake port 39a closest to a center of the first portion 31 of the cylinder 25 to a minimum area of at least one other intake port 39b located substantially diametrically opposite the intake port 39a. While there are not necessarily intake ports between the ports 39a and 39b, there is ordinarily at least one intake port 39c, 39d, 39e, 39f, 39g, 39h between the intake port 39a and the intake port 39b. The intake ports 39a ... 39h can be arranged symmetrically around the circumference of the cylinder 25. The intake ports 39a ... 39h can be but are not necessarily spaced at equal angles around the circumference. The intake ports 39c ... 39h can have areas that are the same as one or the other of the ports 39a or 39b, but ordinarily have an area or areas between the maximum area and the minimum area, with the areas ordinarily progressively decreasing in size from largest closest to the intake port 39a to smallest closest to the intake port 39b.

Longitudinal axes A39a and A39b of at least some of the intake ports 39a ... 39h can be substantially coincident with radii Ra, Rb (FIG. 2) of the cylinder 25 that intersect respective ones of the at least some of the intake ports. Longitudinal axes A39a ... A39h of at least some, ordinarily most or all, of the intake ports 39a ... 39h are substantially parallel, i.e., forming an angle of about 10° or less, to the central axis AI of the inlet channel 37. This facilitates causing most of the intake air flow to enter the first portion 31 of the cylinder 25 while the smaller amount of flow that passes around to the ports on the second portion 33 of the cylinder creates the small air curtain near the cylinder wall to facilitate completely filling the cylinder. Longitudinal axes of some of the intake ports may be non-parallel to the central axis AI of the inlet channel, which may be useful to create a desired flow in the cylinder. It will be observed, for example, that the longitudinal axis A39f of intake port 39f is less parallel to the axis AI of the inlet channel 29 than other longitudinal axes of other intake ports.

As seen in FIG. 1, the intake ports 39a ... 39h are ordinarily longer in a direction parallel to a longitudinal axis AC of the cylinder 25 than in a direction of the circumference of the cylinder and are generally in the shape of elongated slots. Where the first portion 31 of the cylinder 25 is a first half of the cylinder or front of the cylinder closest to the inlet channel 29, and the second portion 33 the cylinder is a second half of the cylinder on a back side of the cylinder relative to the inlet channel, a greater number of the plurality of intake ports 39b, 39b, 39f, 39f, 39g, 39g 39h, 39h may be disposed in the second half of the cylinder than the number of intake ports 39a, 39c, 39c, 39d, 39d, 39e, 39e in the first half the cylinder while, at the same time, a total area of all intake ports in the first half of the cylinder combined may be greater than a total area of all intake ports in the second half of the cylinder combined. To achieve the minimum turbulence and keep the flow patterns in the cylinder 25 parallel, it is desirable to fill each slice of the cylinder corresponding to the intake ports 39a, 39c, 39c, 39d4, 39d, 39e, 39e in the first portion 31 of the cylinder proportionately. Thus, the intake port dimensions are ordinarily proportional to the volume of the slice of the cylinder to which it corresponds and, thus, the intake port 39a most closely directed toward the axis AC of the cylinder (and, thus, the widest portion of the cylinder in cross-section) is ordinarily larger than the others. It will be appreciated that, in reality, the air streams entering the cylinder 25 through the various intake ports 39a . . . 39h may not reach completely across the cylinder due to factors such as interactions with the walls, the piston surfaces, or the wall thickness of the cylinder wall. Therefore, intake ports farthest away from the center axis, e.g., intake ports 39b, 39b, 39f, 39f, 39g, 39g 39h, 39h, and proceeding around the back side of the cylinder may be angled or specially shaped, and in particular shaped to direct the air along the inside wall of the cylinder, to "fill in" relatively dead areas to complete the axial-moving charge air surface. While covering somewhat more than 180° of cylinder liner, these intake ports will ordinarily only supply a relatively small amount of the total charge air.

A cross-sectional area of the intake air gallery 35 can decrease from a largest gallery area closest to the first portion 31 of the cylinder 25 to a smallest gallery area closest to the second portion of the cylinder 33. A portion 37p of the gallery wall 37 closest to the position of minimum volume in the cylinder 51 can define an acute angle greater than 0° with the longitudinal axis AC of the cylinder to facilitate providing a desired direction of air flow into the cylinder 25. The intake air gallery 35 supplying air to the cylinder 25 does not, in general, direct the air flow toward the cylinder axis. To the extent that this occurs, it is primarily a consequence of the orientation of the intake ports and interaction of air flow from the intake ports with the face 45 of the piston 43. The primary purpose of the intake air gallery 35 is to supply a smooth, relatively non-turbulent flow of air in sufficient volume to minimize a pressure drop during scavenging so that the ports 39a . . . 39h and piston face 45 can direct the air appropriately. The portion 37p of the gallery wall 37 may, however, have sloping or rounded transitions into the intake air ports 39a . . . 39h to better utilize the length of the intake air ports between the gallery wall 37 and the cylinder wall 27 add to an axial component to air motion before it enters the cylinder. This effect may be the same for all ports or may vary to achieve the desired flow motion.

The engine 21 further can further comprise an outlet channel 57, particularly in an opposed piston engine, an exhaust air gallery 59 extending around at least a majority of a circumference of the cylinder 25, the exhaust air gallery having an exhaust air gallery wall 61 and being in flow communication with the outlet channel, and a plurality of exhaust ports 63 extending between the cylinder wall 27 and the exhaust air gallery wall. The exhaust ports 63 of the plurality of exhaust ports can be spaced at equal angles around the circumference of the cylinder 25 and can be of equal size, which can facilitate even removal of spent gases as they are forced toward the exhaust ports by the volume of incoming air.

In the opposed piston uniflow engine 21, the piston 43 is an intake piston, and the uniflow engine comprises an exhaust piston 65 disposed in the cylinder. The two pistons 43 and 65 are disposed in the cylinder 25 to close the ends of the cylinder and define a chamber. The piston 43 or pistons 43 and 65 are typically not flat surfaces but, instead, are sculpted in order to create a cavity that is more favorable for combustion. In an opposed piston engine 21, the two pistons 43 and 65 will ultimately come together in near proximity to each other at the point of minimum volume of the cylinder 51 near the center of the cylinder. The cavities sculpted in the pistons 43 and 65 together form a desired combustion chamber. In a single piston engine 21' (FIG. 4), combustion occurs between the piston face 45' and a cylinder head 77'. Angling the nominal separating plane or mean face 47 between pistons 43 and 65 or the mean piston face 47' (and possibly the cylinder head 65') can facilitate redirecting the flow of the incoming charge from a radial to an axial direction.

As shown in phantom in FIG. 3, at least one fuel injector 67 can be provided for injecting fuel into the cylinder 25. A portion of the exhaust piston 63 closest to the at least one fuel injector 67 can include a recess 69 (shown in phantom) to facilitate introducing fuel injected by the fuel injector or, as seen in FIG. 3, to receive a portion 71 (shown in phantom) of the fuel injector 67 that extends into the cylinder when the exhaust piston is at the position of minimum volume of the exhaust piston.

Historically, diesel engine combustion chambers were characterized as "quiescent" or "high swirl". In a quiescent chamber, air is introduced with as little turbulence as possible, and mixing is accomplished by extremely high fuel injection pressure sprays. In swirl chambers, the intake air is intentionally caused to swirl in the chamber by offsetting the intake ports to the cylinder, and by shaping the port runner walls to induce swirl into the air before it enters the cylinder. This allows air-fuel mixing with lower injection pressures. The combustion chambers according to the present invention might be characterized as "semi-quiescent".

The combination of the geometries such as those of the inlet channel 29, the intake air gallery 35, the intake ports 39a . . . 39g, the pistons 43 and 65, and the exhaust ports 63 can facilitate filling the cylinder 25 with intake air through the intake ports 39a . . . 39g that are arranged in the wall 27 of the cylinder while pushing another gas (in the case of an internal combustion engine, the exhaust, or "spent", or burned combustion gases, from the previous cycle) out of exhaust ports 63 in the cylinder. To achieve high power and good efficiency in an internal combustion engine, the design goal is to provide as much fresh intake air as possible in the cylinder, which implies also removing as much of the burned gas as possible at the same time. The maximum replacement of the burned gas with fresh air occurs when the two can be prevented from mixing. The combination of the geometries of the inlet channel 29, the intake air gallery 35, the intake ports 39a . . . 39g, and the piston 43 facilitates introducing the fresh intake gas into the cylinder 25 in such a way as to create a plug of fresh gas, with a predominantly flat, non-turbulent boundary between it and the burned gas in the cylinder 25, that then expands evenly from one end of the cylinder, and displaces the burned gas evenly along the axis AC of the cylinder. The conditions that make this distinct boundary possible include: 1) the pressure in the plug of intake gas being essentially constant across the entire cross sectional area of the cylinder, from edge to center; 2) the velocity vectors of the intake gas entering through the various intake ports 39a . . . 39g being essentially parallel to each other, and normal to the boundary surface; and 3) there being little or no turbulent velocity components across the boundary surface. The reduced turbulence can minimize heat transfer between the incoming air and the cylinder walls, thus increasing thermal efficiency, reduce mixing between the intake and combusted gases, resulting in higher purity of charge, and more closely resembling what is considered "perfect displacement" scavenging for high r power density. With modern high pressure fuel injection systems, the charge motion needed for complete combustion can be achieved with injection spray without the need for inducing swirl for mixing of fuel and intake air.

In the specific case of an opposed piston engine 21, the exhaust exits through the exhaust ports 63 which are also in the wall 27 of the cylinder 25, but at an opposite end of the cylinder from the intake air ports 39a . . . 39h. However, the exhaust gas could also exit through poppet valves or any other type of valves that might be placed in a cylinder head or other location in or near the end of the cylinder opposite the intake air ports 39a . . . 39h, depending on the engine configuration.

The angled mean face 47 of the piston 43 can be beneficial because, if the intake air were to be introduced evenly around the entire circumference of the cylinder 25, the streams of gas from opposite sides of the cylinder would tend to collide at the center and create a tumbling, turbulent motion that would then cause mixing of gases, reducing the effectiveness of the scavenging process somewhat. By introducing the intake air primarily directionally from one side (first portion 31) of the cylinder 25, the angled mean face 45 of the piston 43 can serve to: 1) turn the direction of the incoming air flow from a generally radial direction toward a direction along the axis AC of the cylinder 25, normal to the desired boundary surface between the incoming air and the gases sought to be exhausted; 2) forms a wedge of incoming gas to build an even pressure plug across the majority of the cylinder cross section; and 3) helps direct the gas flows that are away from the primary intake flow to also turn parallel to the cylinder axis, to fill in the fresh gas plug all the way to the edges of the cylinder.

Aside from the exhaust piston and related structure, the structure described above with respect to the opposed piston uniflow engine 21 can be applicable to a single piston uniflow engine 21' as seen in FIG. 4. Instead of an exhaust piston and a plurality of exhaust ports, the single piston uniflow engine 21' can include one or more valves 73' for opening and closing an opening 75' in the cylinder head 77'. A single poppet type valve is shown for purposes of illustration, however, it will be appreciated that plural and/or other types of valves may be used. Otherwise, the single piston uniflow engine 21' can have structures corresponding to those of the opposed piston uniflow engine 21, such as a cylinder 25', an inlet channel 29', an intake air gallery 35', intake ports 39a . . . 39h, and a piston 43' with a mean face 47' disposed at a non-zero angle to a perpendicular of the axis AC of the cylinder 25'.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A uniflow engine, comprising:
   a cylinder having a cylinder wall;
   an inlet channel, an extension of a central axis of the inlet channel first intersecting the cylinder wall in a first portion of the cylinder and next intersecting the cylinder wall in a second portion of the cylinder opposite the first portion of the cylinder;
   an intake air gallery, the intake air gallery having a gallery wall and being in flow communication with the inlet channel; and
   a plurality of intake ports extending between the cylinder wall and the gallery wall, at least some of the intake ports having different areas at the cylinder wall measured perpendicular to longitudinal axes of the intake ports, and wherein an area of at least one of the intake ports in the first portion of the cylinder is larger than an area of at least one of the intake ports in the second portion of the cylinder, and wherein the longitudinal axes of a majority of the intake ports form an angle of 10° or less to the central axis of the inlet channel,
   wherein the first portion of the cylinder is a first half of the cylinder and the second portion of the the cylinder is a second half of the cylinder, and a greater number of the plurality of intake ports is disposed in the second half of the cylinder than in the first half the cylinder.

2. The uniflow engine as set forth in claim 1, wherein the area of the at least one of the intake ports disposed in the first portion of the cylinder is larger than the area of another one of the intake ports located substantially diametrically opposite the at least one of the intake ports disposed in the first portion of the cylinder.

3. The uniflow engine as set forth in claim 1, wherein areas of the intake ports decrease in area from a maximum area of at least one of the intake ports closest to a center of the first portion of the cylinder to a minimum area of at least one other one of the intake ports located substantially diametrically opposite the at least one of the intake ports closest to the center of the first portion of the cylinder.

4. The uniflow engine as set forth in claim 3, wherein at least one of the intake ports between the at least one of the intake ports closest to the center of the first portion of the cylinder and the at least one other one of the intake ports located substantially diametrically opposite the at least one of the intake ports closest to the center of the first portion of the cylinder has an area between the maximum area and the minimum area.

5. The uniflow engine as set forth in claim 1, wherein the longitudinal axes of at least some of the intake ports are substantially coincident with radii of the cylinder that intersect respective ones of the at least some of the intake ports.

6. The uniflow engine as set forth in claim 1, wherein the longitudinal axes of at least some of the intake ports are substantially parallel to the central axis of the inlet channel.

7. The uniflow engine as set forth in claim 1, wherein the longitudinal axes of at least some of the intake ports are nonparallel to the central axis of the inlet channel.

8. The uniflow engine as set forth in claim 1, wherein the intake ports are longer in a direction parallel to a longitudinal axis of the cylinder than in a direction of the circumference of the cylinder.

9. The uniflow engine as set forth in claim 1, wherein a total area of all of the intake ports in the first half of the cylinder combined is greater than a total area of all of the intake ports in the second half of the cylinder combined.

10. The uniflow engine as set forth in claim 1, wherein a cross-sectional area of the intake air gallery decreases from a largest gallery area closest to the first portion of the cylinder to a smallest gallery area closest to the second portion of the cylinder.

11. The uniflow engine as set forth in claim 1, wherein a portion of the gallery wall closest to a position of minimum volume in the cylinder defines an acute angle greater than 0° with a longitudinal axis of the cylinder.

12. The uniflow engine as set forth in claim 1, wherein the central axis of the inlet channel defines an acute angle greater than 0° with a longitudinal axis of the cylinder.

13. The uniflow engine as set forth in claim 1, further comprising an outlet channel, an exhaust air gallery extending around at least a majority of a circumference of the cylinder, the exhaust air gallery having an exhaust air gallery wall and being in flow communication with the outlet channel, and a plurality of exhaust ports extending between the cylinder wall and the exhaust air gallery wall.

14. The uniflow engine as set forth in claim 13, wherein exhaust ports of the plurality of exhaust ports are spaced at equal angles around the circumference of the cylinder.

15. The uniflow engine as set forth in claim 13, wherein all exhaust ports of the plurality of exhaust ports are of equal size.

16. The uniflow engine as set forth in claim 1, comprising a piston disposed in the cylinder, a mean face of the piston defining a non-zero angle with a plane perpendicular to a longitudinal axis of the cylinder.

17. The uniflow engine as set forth in claim 16, wherein a lowest part of the mean face of the piston furthest from a position of minimum volume in the cylinder is adjacent the first portion of the cylinder.

18. The uniflow engine as set forth in claim 17, wherein a highest part of the mean face of the piston closest to the position of minimum volume in the cylinder is adjacent the second portion of the cylinder.

19. The uniflow engine as set forth in claim 16, wherein the uniflow engine is an opposed piston engine, the piston is an intake piston, the uniflow engine comprising an exhaust piston disposed in the cylinder.

20. The uniflow engine as set forth in claim 19, comprising at least one fuel injector for injecting fuel into the cylinder, wherein a portion of the exhaust piston closest to the at least one fuel injector includes a recess.

21. The uniflow engine as set forth in claim 20, wherein at least a portion of the at least one fuel injector extends into the cylinder, the at least a portion of the at least one fuel injector being disposed in the recess when the exhaust piston is at a position of minimum volume of the exhaust piston.

22. The uniflow engine as set forth in claim 16, wherein the uniflow engine is an opposed piston engine, the piston is an intake piston, a second piston is an exhaust piston, and the intake piston and the exhaust piston are disposed in the cylinder and define an enclosed chamber.

23. The uniflow engine as set forth in claim 1, wherein the intake gallery extends around at least a majority of a circumference of the cylinder.

24. A uniflow engine, comprising:
a cylinder having a cylinder wall;
an inlet channel, an extension of a central axis of the inlet channel first intersecting the cylinder wall in a first portion of the cylinder and next intersecting the cylinder wall in a second portion of the cylinder opposite the first portion of the cylinder;
an intake air gallery, the intake air gallery having a gallery wall and being in flow communication with the inlet channel;
a plurality of intake ports extending between the cylinder wall and the gallery wall, at least some of the intake ports having different areas at the cylinder wall measured perpendicular to longitudinal axes of the intake ports, and wherein an area of at least one of the intake ports in the first portion of the cylinder is larger than an area of at least one of the intake ports in the second portion of the cylinder;
a piston disposed in the cylinder, a mean face of the piston defining a non-zero angle with a plane perpendicular to a longitudinal axis of the cylinder, wherein the uniflow engine is an opposed piston engine, the piston is an intake piston;
an exhaust piston disposed in the cylinder;
at least one fuel injector for injecting fuel into the cylinder, a portion of the exhaust piston closest to the at least one fuel injector including a recess, wherein at least a portion of the at least one fuel injector extends into the cylinder, the at least a portion of the at least one fuel injector being disposed in the recess when the exhaust piston is at a position of minimum volume of the exhaust piston,
wherein the first portion of the cylinder is a first half of the cylinder and the second portion the cylinder is a second half of the cylinder, and a greater number of the plurality of intake ports is disposed in the second half of the cylinder than in the first half the cylinder, and wherein a total area of all of the intake ports in the first half of the cylinder combined is greater than a total area of all of the intake ports in the second half of the cylinder combined.

\* \* \* \* \*